Nov. 24, 1936.　　　F. F. UEHLING　　　2,061,884
TEMPERATURE REGULATOR
Filed March 7, 1935　　　3 Sheets-Sheet 3
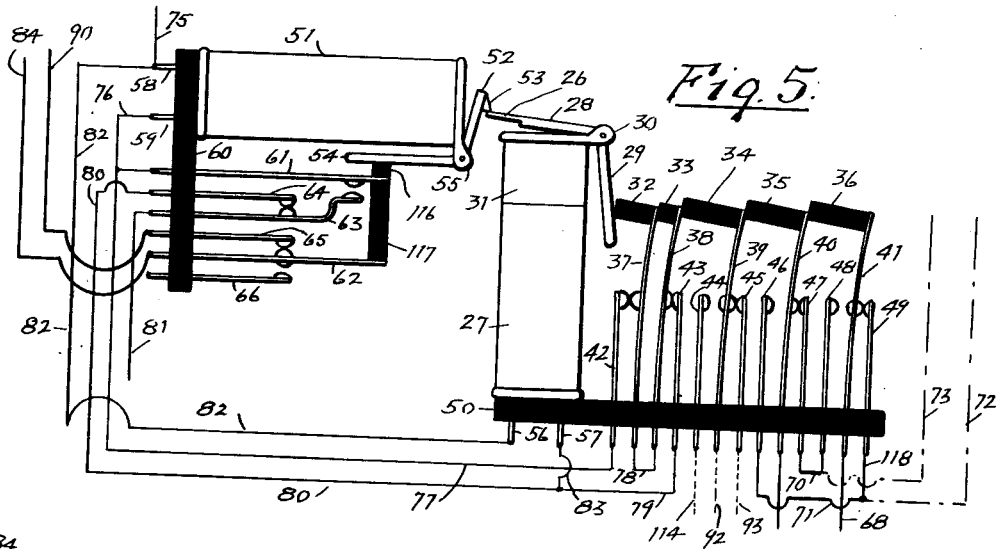
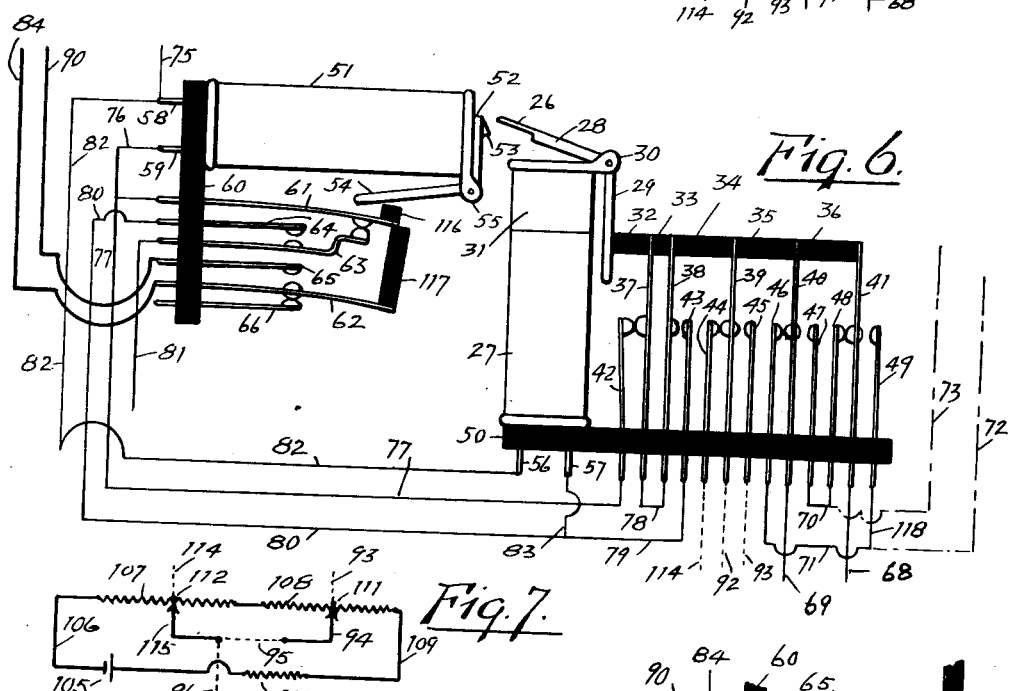
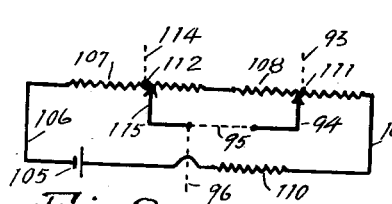
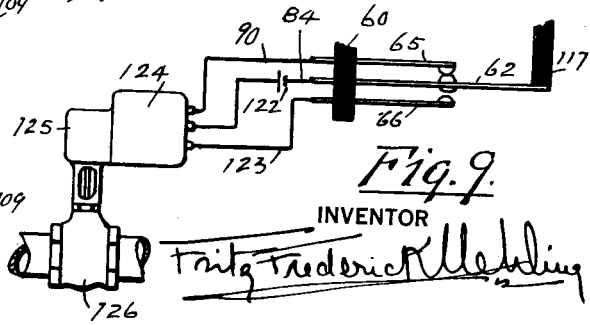
INVENTOR
Fritz Frederick Uehling Patented Nov. 24, 1936

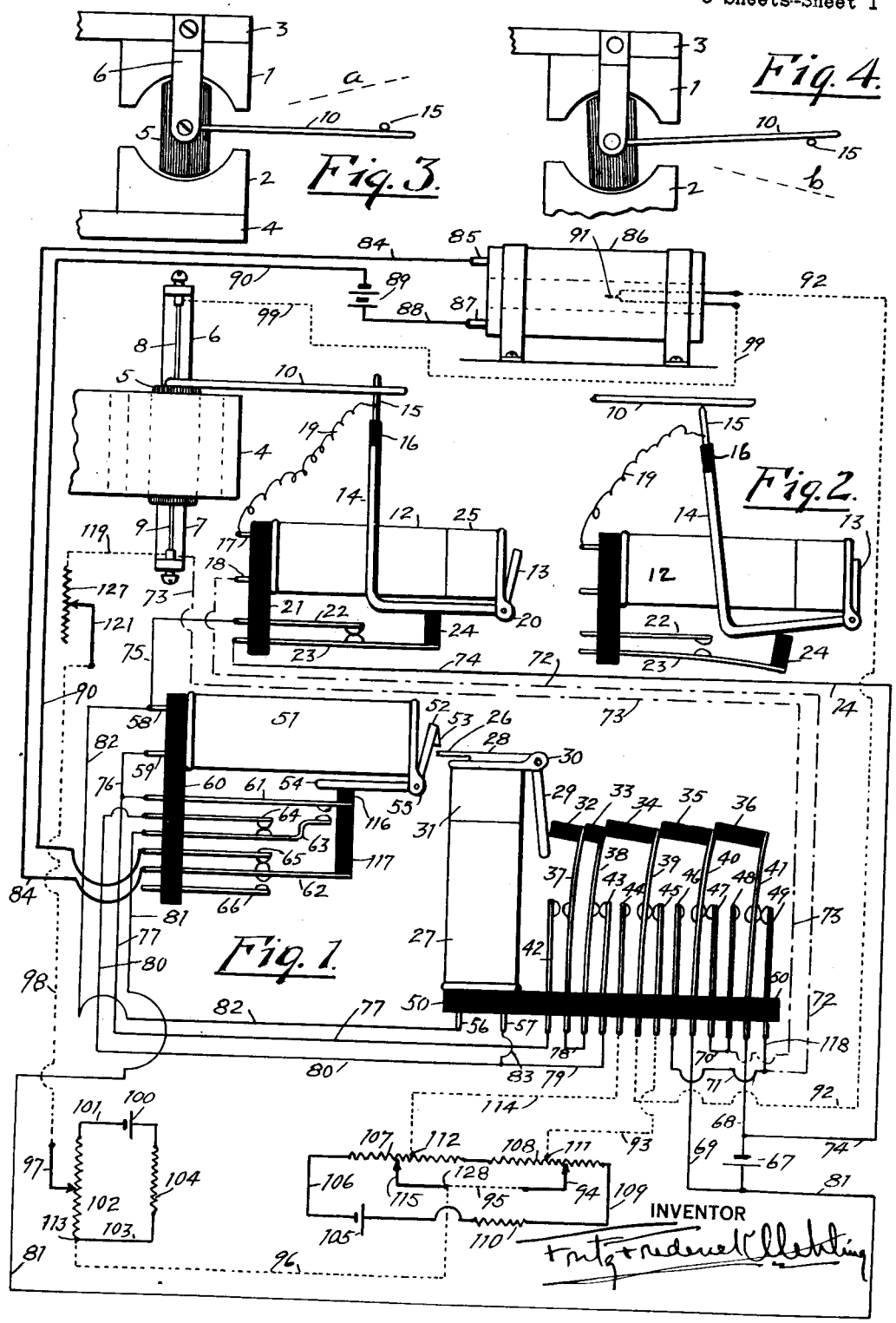

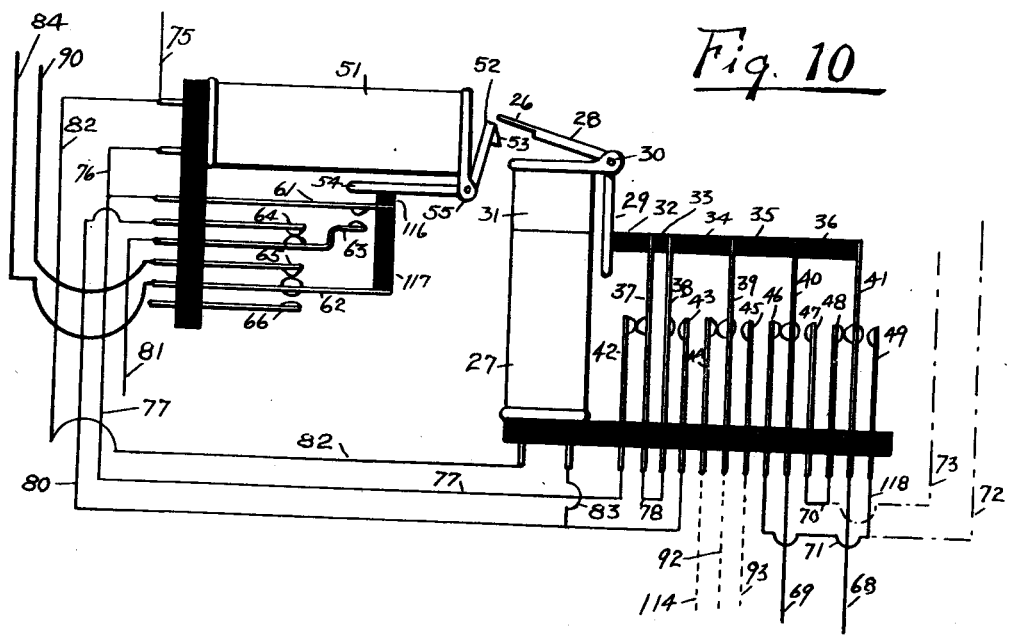

2,061,884

UNITED STATES PATENT OFFICE 2,061,884

TEMPERATURE REGULATOR

Fritz Frederick Uehling, Passaic, N. J.

Application March 7, 1935, Serial No. 9,909

20 Claims. (Cl. 236—78)

This invention relates to improvements in automatic regulators which utilize a galvanometer as the element responsive to changes in the variable regulated. More particularly it provides a novel combination of relays and circuits which relays are actuated by the galvanometer to operate the regulating means. Furthermore the needle of the galvanometer which makes electrical contact to actuate the relays is intercepted by a movable contact piece which is forced out of and into the path of the needle only when the galvanometer is affected by changes in the variable regulated. This, in combination with a novel contact method, eliminates the necessity of a continuous cycle of motion such as is essential in other types of regulators which utilize the galvanometer as the actuating means. A novel arrangement is also provided for anticipating changes in the variable regulated thereby preventing overstepping or hunting.

Figure 1 is a diagrammatical illustration which shows all of the essential elements in elevation with their electrical interconnections; Figure 2 illustrates the relay which actuates the contact piece, and shows the relation of the contact piece with respect to the galvanometer needle, in a position opposite to that illustrated in Figure 1; Figure 3 is a plan view of the galvanometer with the needle in one of its positions with respect to the contact piece; Figure 4 is a plan view of the galvanometer in another of its positions with respect to the contact piece; Figure 5 illustrates two of the relays with their various switches in one of their respective positions; Figure 6 illustrates the same relays with the switches in another of their respective positions; Figure 7 illustrates a special form of variable potentiometer in one of its positions; Figure 8 illustrates the same potentiometer in another of its positions; Figure 9 illustrates two of the relay switches in combination with the motor-operated valve which is actuated by said switches; Figure 10 illustrates another position of the same relays shown in Figures 5 and 6. Similar numerals represent similar parts throughout all of the illustrations.

A galvanometer Figures 1, 3, and 4, consisting of a coil 5 pivoted or suspended between the north and south poles, 1 and 2 respectively, of a permanent magnet, is utilized as the actuating means of the regulator and may be influenced by variations in whatever physical condition is to be controlled. Although a galvanometer may be directly or indirectly influenced by a large variety of physical variables, I have chosen for the purpose of illustration, an electric furnace 86, the temperature of which influences the galvanometer by means of a thermo-couple 91, the electro-motive force of which couple deflects the galvanometer as required to actuate the regulator to maintain the desired temperature in the furnace. The circuit which includes the furnace starts at a battery or any other source of energy 89, thence through wire 90 to a switch consisting of a contact spring 62 and a contact piece 65. This switch will be hereinafter referred to as switch 62—65. From this switch the circuit continues through wire 84 to the furnace, and from the furnace through wire 88 back to the battery.

The circuit which includes the couple and the galvanometer starts at the couple 91, and thence through wire 92 to a contact spring 39. When the contact spring 39 touches a contact piece 45 as illustrated in Figure 1, the circuit continues from contact spring 39 through the contact piece 45 and the wire 93 to a variable potentiometer 108, through which potentiometer it continues from the point 111 to an adjustable brush 94, and thence through wire 95 to the point 128. The contact spring 39 and the contact piece 45, above mentioned, will hereinafter be referred to as switch 39—45. Similarly when the contact spring touches a contact piece 44 as illustrated in Figure 6, the circuit continues from the contact spring 39 through the contact piece 44 and the wire 114, Figure 1, to another variable potentiometer 107, through which potentiometer it continues from the point 112 to an adjustable brush 115 and thence to the point 128. The contact spring 39 and the contact piece 44 will hereinafter be referred to as switch 39—44. This switch and the switch 39—45 thus act respectively to close the couple circuit through the potentiometer 107 or the potentiometer 108 depending upon whether the magnet 27 is deenergized or energized. The purpose of the two potentiometers 107 and 108 and the switches 39—44 and 39—45, and the manner in which the magnet 27 is energized will be presently described. From the point 128 the thermo-couple circuit continues through wire 96 to another variable potentiometer 102 through which it continues from the point 113 to an adjustable brush 97, from the brush 97 through wire 98 to an adjustable resistance 127, and thence through the wire 119, the galvanometer 5 and the wire 99 back to the couple. The thermo-couple circuit is illustrated by means of a dotted line so that it may be readily distinguished from the rest of the circuits. The purpose of the potentiometer 102 is to set the regulator for the temperature at which the furnace is to be maintained. Reference will again be made to both the potentiometer 102 and the resistance 127.

A combination of switches, Figure 1, which consists of a series of contact springs 37, 38, 39, 40 and 41, and a series of contact pieces 42, 43, 44, 45, 46, 47, 48, and 49, are operated by the electro-magnet 27. Said contact springs are held in one position, Figure 1, against their combined tension by means of an arm 29 which forces them into the position illustrated through insulation pieces 32, 33, 34, 35 and 36 when the magnet 27 is energized. The switches consisting of contact spring 37 and contact piece 42, contact spring 38 and contact piece 43, contact spring 40 and contact piece 46, contact spring 40 and contact piece 47, contact spring 41 and contact piece 48, and contact spring 41 and contact piece 49, will hereinafter be referred to as switches 37—42, 38—43, 40—46, 40—47, 41—48 and 41—49 respectively.

An armature 28 which reacts with the magnet 27, is an integral part of the arm 29 and is pivoted at 30, as illustrated, so that when the magnet is energized, the switches 37—42, 39—44, 40—46, and 41—48 will be open, and the switches 38—43, 39—45, 40—47 and 41—49 closed. On the other hand when the magnet 27 is deenergized, and when the armature 28 is free to return to its normal position, it will be forced to that position, as illustrated by Figure 6, by the tension of the contact springs 37, 38, 39, 40 and 41 through the insulation pieces 32, 33, 34, 35 and 36 in which position the switches 37—42, 39—44, 40—46 and 41—48 will be closed and the switches 38—43, 39—45, 40—47, and 41—49 opened. All of the switches actuated by the magnet 27 are supported and insulated from each other by an insulation piece 50 which at the same time supports the magnet 27 and insulates the magnet connections 56 and 57.

A second electro-magnet 51, Figure 1, which operates another combination of switches is provided with an armature 52 which armature is an integral part of an arm 54 and is pivoted, as illustrated, at 55. The armature 52 is provided with a catch 53, while the armature 28 is provided with an extension 26. The relative positions of the electro-magnets 27 and 51 are such that if the magnet 27 is energized while the magnet 51 is deenergized, the catch 53 and the extension 26 will act as a latch to prevent the return of the armature 28 to its normal position when the magnet 27 is deenergized as illustrated in Figure 5. The purpose of this latch, and the effect which the energized, deenergized and latched positions have on the switches will be presently described. The combination of four switches which are operated by the magnet 51, consist of a series of contact springs 61, 63, and 62, and a series of contact pieces 64, 65 and 66. These switches which consist respectively of contact spring 61 and contact spring 63, contact spring 63 and contact piece 64, contact spring 62 and contact piece 65, and contact spring 62 and contact piece 66, will hereinafter be referred to as switches 61—63, 63—64, 62—65 and 62—66. When the magnet 51 is deenergized, the switches 63—64 and 62—65 will be closed, and the switches 61—63 and 62—66 opened, as illustrated in Figure 1. Similarly when the magnet 51 is energized, the arm 54 will force the contact springs to one side through insulation pieces 116 and 117 and thus closing the switches 61—63 and 62—66 and opening the switches 63—64 and 62—65 as illustrated in Figure 6. It should be noted, however, that the shape of the contact spring 63 is such that when the magnet 51 is energized, the switch 61—63 will close before the switch 63—64 opens. Reference to this sequence will be made later.

The circuit through the electro-magnets 27 and 51, Figure 1, are opened and closed by means of a switch consisting of a contact spring 23 and contact piece 22. This switch will hereinafter be referred to as switch 22—23 and is operated by an electro-magnet 12 through an extension arm 14 and an insulation piece 24. The extension arm 14 is an integral part of an armature 13 which is pivoted at 20 so that when the magnet is energized, the switch will be open as illustrated in Figure 2, and closed as illustrated in Figure 1 when the magnet is deenergized. Fastened to the upper end of the extension arm 14, as illustrated, is an electric contact piece 15, which is insulated from the arm 14 by means of an insulation piece 16. The normal position of the contact piece 15, as illustrated in Figures 1, 3 and 4, is such that the galvanometer needle 10 will be intercepted by the contact piece when the needle is deflected in one direction or the other depending upon which side of the contact piece the needle is at the time. However when the contact piece is forced down by the magnet 12 as illustrated in Figure 2, the needle will be free to move in either direction without interception. The purpose of the contact piece 15 and the manner in which electrical contact is established between it and the needle will be presently described.

The circuit which includes the magnet 12 also includes the galvanometer coil 5, the needle 10, and contact piece 15, a battery 67 and the combination of switches 40—46, 40—47, 41—48 and 41—49. The purpose of these switches is to change the polarity of the battery 67 from one direction to another depending upon whether the magnet 27 is energized as illustrated in Figure 1, or deenergized as illustrated in Figure 6. There are therefore really two circuits, each of which includes the galvanometer coil 5, the needle 10, the magnet 12 and the battery 67, the first of which includes the switches 40—47 and 41—49 and through which circuit the current flows in one direction, and the second of which circuits includes the switches 40—46 and 41—48 and through which second circuit the current flows in the opposite direction. Thus when the magnet 27 is energized, the circuit starts at battery 67, thence through wire 68 to the switch 41—49, from the switch through wires 118 and 72 to the magnet 12, from the magnet 12 through a flexible connection 19 to the contact piece 15, and when the needle 10 touches the contact piece 15 the circuit continues through the needle to the galvanometer coil 5, thence through wires 73 and 70 to the switch 40—47, and from the switch through wire 69 back to the battery. On the other hand when the magnet 27 is deenergized, the switches 40—46 and 41—48 will be closed, Figure 6, and the battery will supply current through the galvanometer and the magnet 12 in the opposite direction. This circuit starts at battery 67, Figure 1, thence through wire 68 to switch 41—48, Figure 6, from the switch through wire 73 to the galvanometer, Figure 1, thence through the galvanometer coil 5 to the needle 10, and when the needle touches the contact piece 15, the circuit continues through the contact piece 15 and the flexible connection 19 to the magnet 12, from the magnet through wires 72 and 71 to the switch 40—46, Figure 6, and from the switch through wire 69 back to the battery. The reason for reversing the polarity in this manner and the effect which the reversal has on the action of the galvanometer will be presently described.

It will be noted that there are two positions for the switches actuated by the electro-magnet 51. One position, when the magnet 51 is deenergized, is illustrated by Figures 1, 5 and 10, and the other position when the magnet 51 is energized, is illustrated by Figure 6. In the first or de-energized position the switch 61—63 will be open and the switches 63—64 and 62—65 will be closed. On the other hand in the second or energized position, Figure 6, the switch 61—63 will be closed and the switches 63—64 and 62—65 will be open. The switches actuated by the electro-magnet 27 will have, however, three different positions, one in which the electro-magnet 27 is energized as illustrated in Figure 1, a second position in which the magnet 27 is deenergized but in which position the armature 28 is held by the latch as illustrated in Figure 5, and the third position in which the latch has been released thereby permitting the armature 28 to move to its completely open position as illustrated in Figures 6 and 10. In the first of said three positions the switches 37—42, 39—44, 40—46, and 41—48 will be open and the switches 38—43, 39—45, 40—47, and 41—49 will be closed. In the second or latched position, as illustrated in Figure 5, the switch 37—42 will be closed due to the slight motion of the armature 28 from its energized position to its latched position. This small motion of the armature will however not affect the open or closed positions of the remaining switches which will remain the same as illustrated in Figure 1. The closing of the switch 37—42 by the motion of the armature from its energized to its latched position without affecting the remaining switches is an important part of this invention and will be referred to again in connection with the circuit which includes this switch. In the third or unlatched position as illustrated in Figures 6 and 10 the switch 37—42 will obviously still remain closed while switches 39—44, 40—46 and 41—48 will also be closed and the switches 38—43, 39—45, 40—47 and 41—49 will be open.

The circuits which include the electro-magnet 51 and the electro-magnet 27 will be open and closed primarily by the switch 22—23 which switch as previously stated is operated by the electro-magnet 12. The energy which actuates the magnets 51 and 27 is supplied by the battery 67. When both the magnets 51 and 27 are de-energized, the armatures 52 and 28 will be in the positions illustrated in Figures 5 or 10 depending upon whether the armature 28 is in its latched or unlatched position. With said armatures in the positions illustrated in Figure 10, the electro-magnet 27 will be energized when the switch 22—23 is closed through the circuit which starts at battery 67, Figure 1, thence through wire 74 to the switch 22—23, from this switch through wires 75 and 82 to the electro-magnet 27, Figure 10, from the magnet 27 through wires 83 and 80 to the switch 63—64 and from the switch 63—64 through wire 81, Figure 1, back to the battery. The closing of this circuit energizes the magnet 27 to force the switches actuated thereby into the positions illustrated in Figure 1.

If now the magnet 12 be energized thereby opening the circuit just traced and which includes the magnet 27, the armature 28 will be free to move to its latched position as illustrated in Figure 5 in which latched position the switches 37—42 and 38—43 will be closed as illustrated. If now the magnet 12 is deenergized, the switch 22—23 will again close but this time the circuit which it closes will include the magnet 51 which when energized will release the latch to permit the armature 28 and the switches operated thereby to return to the position illustrated in Figure 6. This circuit which includes the magnet 51 starts at battery 67, Figure 1, thence through wire 74 to the switch 22—23, from this switch through wire 75 to the magnet 51, from the magnet 51 through wires 76 and 77 to the switch 37—42, Figure 5, from this switch through wire 78 to switch 38—43, thence through the wires 79 and 80 to the switch 63—64 and from this switch, Figure 1, through wire 81 back to the battery. The releasing of the latch by the magnet 51 which magnet is included in the circuit just traced, will permit the armature 28 to return to the position illustrated in Figure 6. In this position the switch 38—43 which is included in the circuit last traced, will be open. The magnet 51 will however remain energized due to the switch 61—63 which, in the position illustrated in Figure 6 closes a holding circuit which starts at battery 67, Figure 1, thence through wire 74 to the switch 22—23, from this switch through wire 75 to the magnet 51, from the magnet 51 through the wire 76, Figure 6, to the switch 61—63, and from this switch through wire 81 back to the battery. The contact spring 63, as previously stated, is so shaped that the switch 61—63 closes before the switch 63—64 opens, thus closing said holding circuit before the circuit which first energized the magnet 51 is opened. It will also be noted that when the switches are in the positions illustrated in Figure 5, when the magnet 51 is first energized, current will also flow through the magnet 27 through wires 75, 82, 83, 80, switch 63—64 and wire 81. The magnet 27 is, however, provided with a copper slug 31 which retards its reaction with the armature 28. The magnet 51, however, reacts with its armature immediately thereby breaking the circuits through the switch 63—64 before the magnet 27 has time to act, and simultaneously closing the holding circuit which as stated keeps the magnet 51 energized to hold the switches in the positions illustrated in Figure 6. If the switch 22—23 be now open, the magnet 51 will be deenergized and the switches actuated by magnets 51 and 27 will assume the positions illustrated in Figure 10. The next closing of the switch 22—23 will however again energize the magnet 27 which in the manner already stated will reestablish the switches in the positions illustrated in Figure 1.

It is obvious from the above that as the switch 22—23 is consecutively opened and closed, the switches actuated by the magnets 51 and 27 will assume the consecutive positions as illustrated by Figures 10, 1, 5 and 6 respectively, this cycle consisting of four definite steps, repeating itself continuously so long as the consecutive opening and closing of the switch 22—23 continues. In other words when the switch 22—23 is opened and closed the first time, the switches operated by the magnets 27 and 51 will take the positions illustrated in Figure 6, and when the switch 22—23 is opened and closed the second time, the switches operated by the magnets 27 and 51 will take the positions illustrated in Figure 1. It therefore follows that as the magnet 12 is repeatedly energized and de-energized, the switches operated by the magnets 27 and 51 will change from one to the other of the two positions illustrated in Figures 1 and 6 respectively.

The armature 13 when it reacts with the magnet 12 also lowers the contact piece 15 so that it will be below the plane in which the needle 10 of the galvanometer deflects as illustrated in Figure 2. On the other hand when the magnet 12 is deenergized, the contact piece 15 will be in its normal position as illustrated in Figure 1, in which position the contact piece 15 will be in the path of the needle. Let us assume that the contact piece 15 is in its normal position (magnet 12 deenergized) and that the galvanometer needle 10 has been deflected counter-clockwise against one side of the contact piece 15 as illustrated in Figure 3. Let us also assume that just before contact between the needle 10 and the contact piece 15 has been established the switches operated by the magnets 27 and 51 are in the positions illustrated in Figure 1. The delicate force of the galvanometer needle against the contact piece 15 will close the circuit (already traced) through the galvanometer coil 5 and the magnet 12. Due, however, to the delicate force of the needle, insufficient current will flow through the circuit to actuate the magnet 12. With the switch positions as illustrated in Figure 1, the switches 40—41 and 41—49 will be closed which provides the proper polarity from the battery 67 to cause a current flow through the galvanometer coil 5 in the proper direction to force the needle 10 tighter against the contact piece 15. This increased pressure will obviously decrease the contact resistance between the needle 10 and the contact piece 15 thus increasing the current flow through the circuit which includes the galvanometer coil 5 and the magnet 12, thereby still further increasing the pressure between the galvanometer needle and the contact piece 15 thus continuously decreasing said contact resistance until sufficient current flows through the magnet 12 to open the switch 22—23, and pull the contact piece 15 down below the path of the needle as illustrated in Figure 2. As soon as the contact piece 15 is below the path of the needle, the latter, due to the force with which it rested against the contact piece, will snap to some new position a, Figure 3, to which position, as illustrated by the dotted line, it will be carried by inertia. The breaking of the contact between the needle 10 and the contact piece 15 will deenergize the magnet 12 thus again closing the switch 22—23 and permitting the contact piece 15 to return to its normal position as illustrated in Figure 1. The opening and closing of the switch 22—23 thus effected will have caused the switches operated by the magnets 27 and 51 to shift to the positions illustrated in Figure 6 in the manner previously stated. After the contact piece has thus returned to its normal position, the galvanometer needle will obviously be on the opposite side of the contact piece so that when it is deflected in a clockwise direction it will make electrical contact with the contact piece 15 as illustrated in Figure 4. When contact has thus been established, by the delicate force of the needle, the circuit through the magnet 12 and the galvanometer coil 5 will be closed. Due, however, to the delicate force of the needle, insufficient current will flow through the circuit to actuate the magnet 12. The switches 40—46 and 41—48, as illustrated in Figure 6, will however now be closed thus reversing the polarity of the current flowing from the battery 67 so that the current flowing through the galvanometer coil 5 will force the needle tighter against the contact piece 15. This increased pressure will obviously decrease the contact resistance between the needle 10 and the contact piece 15 thus increasing the current flow through the circuit which includes the galvanometer coil 5 and the magnet 12, thereby still further increasing the pressure between the galvanometer needle and the contact piece 15 thus continuously decreasing said contact resistance until sufficient current flows through the magnet 12 to open the switch 22—23 and again pull the contact piece 15 down below the path of the needle as illustrated in Figure 2. As soon as the contact piece 15 is below the path of the needle, the latter, due to the force with which it rested against the contact piece will snap to some new position b, Figure 4, to which position as illustrated by the dotted line it will be carried by inertia. The breaking of contact between the needle 10 and the contact piece 15 will deenergize the magnet 12, thus again closing the switch 22—23 and permitting the contact piece 15 to return to its normal position as illustrated in Figure 1. The opening and closing of the switch 22—23 thus effected will have caused the switches operated by the magnets 27 and 51 to return to the positions illustrated in Figure 1 in the manner previously stated. After the contact piece has thus returned to its normal position, the galvanometer needle will obviously be again on that side of the contact piece 15 as illustrated in Figure 3 so that when it is again deflected in a counter-clockwise direction sufficiently to touch the contact piece 15, the switches operated by magnets 27 and 51 will again be shifted to the position illustrated in Figure 6.

It will be noted that the galvanometer coil 5 is included in both the circuit which includes the magnet 12 and the circuit which includes the thermo-couple. In other words the coil 5 and the thermo-couple circuit are in parallel so that the current from the battery 67 for energizing the magnet 12 actually divides itself into two paths after it passes through the needle, one path through the galvanometer coil and the other path through the thermo-couple. The adjustable resistance 127, already referred to, may therefore be increased or decreased as required to make the contact pressure between the needle and the contact piece 15 more or less as desired.

Let us assume that the zero or null position of the indicating needle 10 is such that the axis of the needle coincides with the axis of the contact piece 15. Under these conditions if the needle were manually forced to the position a, Figure 3, it would naturally return clockwise until intercepted by the contact piece 15, Figure 4, by means of which contact piece, its return to the above assumed null position would be prevented. Similarly if the needle were manually forced to the position b, Figure 4, it would naturally return counter-clockwise until intercepted by the contact piece 15, Figure 3, by means of which contact piece its return to the above assumed null position would be prevented. In other words if the zero or null position of the needle 10 is such that its axis coincides with the axis of the contact piece 15 it will always come to a position in which it touches one side or the other of the contact piece 15, as long as there is no current flow through the galvanometer coil. As previously stated, however, the galvanometer circuit which includes the couple 91, also includes one or the other of the potentiometers 107 or 108, Figure 1, depending respectively upon whether the switch 39—44 or the switch 39—45 is closed. It therefore follows that if the potentiometers 107 and 108 are adjusted to their zero positions as illustrated in Figure 7, and if there is no electro-motive force created by the couple, then the switch 22—23 will continue to open and close due to the contact which the needle makes with the contact piece 15 alternately in clockwise and counter-clockwise directions.

When the needle is on that side of the contact piece 15 as illustrated in Figure 3, the switches operated by the magnets 27 and 51 will be in the positions illustrated in Figure 1, in which positions the switch 39—45 will be closed to include the potentiometer 108 in the couple circuit. With the potentiometer 108 properly adjusted as illustrated by Figure 8, and under the asumption that there is no other active source of electrical energy in the thermo-couple circuit then the drop across this potentiometer will be just sufficient and in the proper direction to deflect the galvanometer needle clockwise from its zero position to prevent electrical contact between the needle and the contact piece 15, Figure 3, and to establish a very minute gap between said needle and the contact piece. In other words when the switch 39—45 is closed as illustrated in Figure 1, the position of the needle with respect to the contact piece 15 would be as illustrated in Figure 3 except that the drop across the potentiometer 108 would be just sufficient to deflect the needle clockwise to a position in which it just fails to touch the contact piece when there is no other active source of electromotive force in the galvanometer circuit. Similarly when the needle is on that side of the contact piece 15 as illustrated in Figure 4, the switches operated by the magnets 27 and 51 will be in the positions illustrated in Figure 6 in which positions the switch 39—44 will be closed to include the potentiometer 107 in the couple circuit. With the potentiometer 107 properly adjusted as illustrated in Figure 8, and under the assumption that there is no other active source of electrical energy in the thermo-couple circuit then the drop across this potentiometer will be just sufficient and in the proper direction to deflect the galvanometer needle counter-clockwise from its zero position to prevent electrical contact between the needle and the contact piece 15, Figure 4, and to establish a very minute gap between said needle and contact piece. In other words when the switch 39—44 is closed as illustrated in Figure 6, the position of the needle with respect to the contact piece 15 will be as illustrated in Figure 4 except that the drop across the potentiometer 107 will be just sufficient to deflect the needle counter-clockwise to a position in which it just fails to touch the contact piece when there is no other active source of electro-motive force in the galvanometer circuit. It therefore follows that when the brushes 94 and 115 are adjusted as illustrated in Figure 8, the galvanometer needle 10 will just fail to touch the contact piece 15, Figure 3, when the switches operated by magnets 27 and 51 are in the positions illustrated in Figure 1, and it will just fail to touch the contact piece 15, Figure 4, when the switches operated by the magnets 27 and 51 are in the positions illustrated in Figure 6. In other words when there is no electro-motive force from the thermo-couple, the needle 10 will just fail to touch the contact piece 15 regardless of what side of the contact piece the needle may be (Figures 3 and 4).

The polarity of the couple 91 is such that as the temperature of the furnace 86 increases, the needle of the galvanometer will deflect counter-clockwise, and as the temperature of the furnace decreases the needle of the galvanometer will deflect clockwise. The potentiometer 102, previously referred to, has a polarity opposite to that of the couple, and may be adjusted to balance the electro-motive force of the couple for any given temperature of the furnace. Let us assume that the potentiometer 102 has been adjusted to balance the electro-motive force of the couple when the temperature of the furnace is 500 degrees. Under these conditions, as the temperature of the furnace increases, and with the potentiometers 107 and 108 adjusted as above stated, Figure 8, the needle will deflect counter-clockwise toward the contact piece 15, and when the temperature is just a shade less than 500 degrees the galvanometer needle will be in the position illustrated in Figure 3 except that the needle will not be deflected quite sufficiently in a counter-clockwise direction to make electrical contact with the contact piece 15. Furthermore with the needle in that position, the switches operated by the magnets 27 and 51 will be in the positions illustrated in Figure 1. In this position the furnace circuit previously traced will be closed by the switch 62—65 under which condition the furnace temperature will obviously increase until 500 degrees has been reached, at which temperature contact will be established, Figure 3, between the galvanometer needle and the contact piece 15. This will close the independent circuit, previously traced, through the galvanometer coil 5 which circuit includes the magnet 12, the battery 67, and the switches 40—47 and 41—49 which switches, in the manner previously stated, establish the proper polarity from the battery 67 to force the needle 10 tighter against the contact piece 15 in a counter-clockwise direction. The pressure between the needle and the contact piece 15 continually increases, in the manner already stated, until sufficient current flows through the magnet 12 to open the switch 22—23 and to pull down the contact piece 15 to a point below the plane in which the needle 10 moves. The breaking of contact between the needle and the contact piece 15 when the magnet 12 is energized will, in the manner previously stated, cause the needle temporarily to be forced to the position a, Figure 3, and simultaneously to deenergize the magnet 12, thereby allowing the contact piece 15 to return to its normal position, as illustrated in Figure 1, and again close the switch 22—23. The opening and closing of switch 22—23 will, in the manner previously stated, cause the switches operated by the magnets 27 and 51 to shift to new positions illustrated in Figure 6. In these positions the thermo-couple circuit will include the potentiometer 107 instead of 108 due to the closing of the switch 39—44. The switch 62—65 will be open to deenergize the furnace, and the switches 40—46 and 41—48 will be closed to change the polarity of the circuit which includes the galvanometer needle and the contact piece 15.

Due to the heat still in the resistance wires of the furnace after the heat has been turned off, the temperature of the couple will obviously increase to some point beyond the 500 degrees for which temperature the adjustable potentiometer 102 was set. Due to the fact, however, that the furnace circuit is open through the switch 62—65, Figure 6, the temperature of the furnace and the couple 91 will gradually recede thus causing the needle of the galvonometer to deflect in a clockwise direction until the temperature of the furnace drops to exactly 500 degrees at which temperature the galvonometer needle will make contact with the opposite side of the contact piece 15 as illustrated in Figure 4. This will close the second independent circuit (previously traced) through the galvanometer coil 5 which circuit includes the magnet 12, the battery 67 and the switches 40—46 and 41—49, Figure 6. The switches 40—46 and 41—48, as stated, establish the proper polarity from the battery 67 to force the needle 10 tighter against the contact piece 15 in a clockwise direction, the pressure between the needle and the contact piece 15 continually increasing in the manner previously described, until sufficient current flows through the magnet 12 to again open the switch 22—23 and to pull down the contact piece 15 to a point below the plane in which the needle moves. The breaking of the contact between the needle 10 and contact piece 15 when the magnet 12 is energized will, as previously stated, cause the needle temporarily to be forced to the position $b$, Figure 4, and simultaneously to again de-energize the magnet 12, thereby allowing the contact piece 15 to return to its normal position as illustrated in Figure 1, and to again close the switch 22—23. The opening and closing of the switch 22—23 will this time, in the manner previously described, cause the switches operated by magnets 27 and 51 to shift back to the positions illustrated in Figure 1. In these positions the couple circuit will again include the potentiometer 108 instead of potentiometer 107 due to the closing of the switch 39—45. The switch 62—65 will again be closed to energize the furnace, and the switches 40—47 and 41—49 will again be closed to effect the proper polarity of the circuit which includes the magnet 12 to insure electric contact between the needle and the contact piece 15, when the temperature of the furnace again reaches 500 degrees. Due to the cooling rate of the furnace when the furnace circuit is open, the temperature of the couple may drop somewhat below 500 degrees, for which temperature as previously stated the potentiometer 102 has been set. Due to the fact, however, that the furnace circuit is now again closed through the switch 62—65, Figure 1, the temperature of the furnace and the couple 91 will again rise thus causing the needle of the galvanometer to again deflect in a counter-clockwise direction until the temperature of the furnace again reaches 500 degrees at which temperature the needle 10 will again make contact with the contact piece 15, Figure 3, to again shut off the furnace in the manner above stated.

It thus follows that when the temperature of the furnace is below 500 degrees, for which the potentiometer 102 has been set, the indicating needle 10 will be on that side of the contact piece 15 as illustrated in Figure 3, and when the temperature increases to 500 degrees the needle will make electric contact with the contact piece 15, in a counter-clockwise direction thus closing the actuating circuits which operate the relays in the manner described to open the furnace circuit. Similarly when the temperature of the furnace is above 500 degrees, the indicating needle 10 will be on that side of the contact piece as illustrated in Figure 4, and when the temperature drops to 500 degrees, the needle will make electric contact with the contact piece 15 in a clockwise direction thus closing the actuating circuits which operate the relays in the manner described to close the furnace circuit. The furnace will therefore be kept at a constant temperature within the overstepping characteristics of the furnace itself, said constant temperature being determined by the setting of the potentiometer 102.

The primary purpose of the potentiometers 107 and 108 in combination with the switches 39—44 and 39—45 is to provide sufficient electro-motive force in the proper direction to just prevent the galvanometer needle touching the contact piece 15 when the eceltro-motive force of the couple is balanced by the potentiometer 102, and regardless of whether the needle is on one side or the other of said contact piece. The manner in which this is accomplished has already been described. The same combination of potentiometers and switches may, however, also be utilized to prevent overheating or over cooling of the furnace such as it generally experienced to a more or less degree with all off and on types of temperature regulators. As previously stated, due to the pressure of the needle against the contact piece 15 in one direction or the other as caused by the circuit which includes the magnet 12, the needle 10, and the galvanometer coil 5, the needle will snap to position $a$, Figure 3, or to a position $b$, Figure 4, depending upon which side of the contact piece 15 the needle is at the time contact is established. The galvanometer is however dampened, electrically or otherwise, so that a measurable time increment elapses before the needle returns to its correct position as determined by the amount of current flowing through the thermo-couple circuit. The time required for the needle to deflect from the position $a$, Figure 3, until it again touches the contact piece 15 as illustrated in Figure 4, may for example be reduced to any magnitude even to practically instantaneous action by adjusting the potentiometer 107 in the proper direction. The return of the needle to the position illustrated in Figure 4 may also be delayed as much as desired by adjusting the same potentiometer in the opposite direction. Similarly the time required for the needle to deflect from the position $b$, Figure 4, until it again touches the contact piece 15 as illustrated in Figure 3, may be reduced to any magnitude, even to practically instantaneous action by adjusting the potentiometer 108 in the proper direction, and the return of the needle to the position illustrated in Figure 3, may also be delayed as much as desired by adjusting the same potentiometer in the opposite direction. It therefore follows that the time required for turning on the heat input to the furnace after it was turned off by the regulator may be influenced in one direction or the other by adjusting the potentiometer 108, and the time required for turning off the heat input to the furnace after it has been turned on by the regulator may be influenced in one direction or the other by adjusting the potentiometer 107. The regulator may thus be adjusted to suit the particular characteristics of any furnace so that any lag in response to changes in the rate of heat input will not affect the temperature in the furnace for which the regulator is set.

Although the regulator as described, automatically opens and closes an electric furnace circuit as required to maintain a constant temperature in the furnace, it is obvious that the same regulator may be utilized to open and close a valve, or damper or any other throttling means as required to maintain a constant condition. As a definite example I have illustrated, Figure 9, a steam valve 126 which is operated by a reversible motor 124 through a gear box 125, and through which steam may be turned off or on as required to maintain a constant temperature in some chamber not shown. The switches 62—65 and 62—66, Figure 9, are the same as illustrated in Figure 1. The circuit for operating the motor to open the valve includes the battery 122 and the switch 62—65 and the circuit for operating the motor to close the valve includes said battery and the switch 62—66. If the thermo-couple 91 be located in the chamber and the potentiometer 102 is set for some definite temperature, it is obvious that the valve will be automatically opened or closed as required to maintain that temperature.

Having thus described my invention, what I claim and desire to secure by Letters Patent is:

1. In a device of the class described, the combination with an armature, of a spring arrangement for holding the armature in its normal position, an electro-magnet for pulling the armature away from its normal position to a second position, a latch for preventing the return of the armature to its normal position after the magnet has been deenergized but permitting a slight motion toward normal to a third position, a second electro-magnet for releasing the latch to permit the armature to return to its normal position, a switch which is opened by the armature when the armature is in its second position and closed when the armature is in its third and normal position, a second switch which is closed by the armature when the armature is in its second and third positions and opened when the armature is in its normal position, a third switch and a fourth switch which are opened and closed respectively by the second magnet when the magnet is energized, and closed and opened respectively when the magnet is deenergized, means for closing the fourth switch before the third switch is opened as the second magnet is energized, and means for closing the third switch before the fourth switch is opened as the second magnet is deenergized, a galvanometer, a fifth switch controlled by the galvanometer, a circuit which includes the fifth switch, the third switch and the first magnet, a second circuit which includes the fifth switch, the third switch, the second switch, the first switch and the second magnet, and a third circuit which includes the fifth switch, the fourth switch, and the second magnet.

2. In a device of the class described, the combination with a galvanometer consisting of the usual coil pivoted between the poles of a permanent magnet, an indicating needle fastened to the coil, of a contact piece for making electrical contact with the needle when the needle is deflected against the contact piece, a circuit which includes the needle, the coil and the contact piece, a relay in the circuit, a second relay for changing the polarity of the circuit, said second relay being controlled by the first relay, and an independent circuit for energizing the coil to deflect the needle against the contact piece.

3. In a device of the class described, the combination with an electric circuit, of means for changing the circuit from a given polarity to the opposite polarity, means for changing the circuit from the opposite polarity back to the given polarity, a relay in the circuit for actuating both changing means, a galvanometer in the same circuit for actuating the relay, and an independent circuit for actuating the galvanometer.

4. In a device of the class described, the combination with an electric circuit, of means for changing the circuit from a given polarity to the opposite polarity, means for changing the circuit from the opposite polarity back to the given polarity, a relay in the circuit for actuating both changing means, a galvanometer in the same circuit for actuating a switch to close the circuit, and an independent circuit for energizing the galvanometer to close the switch.

5. In a device of the class described, the combination with a galvanometer, of an indicating needle actuated by the galvanometer, a contact piece with which the needle makes electrical contact, a relay, a source of electrical energy, a circuit which includes the relay, the contact piece, the needle, the galvonometer and the source of electrical energy, means actuated by the relay for changing the polarity of the source, a second source of electrical energy, and a second circuit which includes the galvanometer and the second source.

6. In a device of the class described, the combination with a galvanometer of a needle actuated by the galvanometer, a contact piece in the path of the needle with which the needle is capable of making electrical contact, electrical means for forcing the contact piece out of the path of the needle, a circuit which includes the galvanometer, the needle, the contact piece and the electrical means, and an independent circuit for energizing the galvanometer to deflect the needle against the contact piece.

7. In a device of the class described, the combination with a galvanometer, of a needle actuated by the galvanometer, a contact piece in the path of the needle with which the needle is capable of making electrical contact, electrical means for forcing the contact piece out of the path of the needle, a circuit which includes the galvanometer, the needle, the contact piece and the electrical means, a second electrical means for reversing the polarity of the circuit, and a switch actuated by the first electrical means for closing a circuit through the second electrical means.

8. In a device of the class described, the combination with a source of electrical energy, of electrical means for changing the polarity of the source, a relay for actuating the electrical means, a galvanometer, a circuit which includes the galvanometer, the relay and the source, a second circuit which includes the galvanometer, and a second source of electrical energy included in the second circuit for energizing the galvanometer.

9. In a device of the class described, the combination with a galvanometer, of a thermo-couple, an electric circuit which includes the galvanometer and the couple in parallel, a source of electrical energy in the circuit, means for changing the ratio of the electrical flow through the couple to the electrical flow through the galvanometer, a switch actuated by the galvanometer for closing the circuit, a relay in the circuit for actuating an electrical means to change the polarity of the circuit, and a second and independent circuit which includes the ratio changing means, and the couple for energizing the galvanometer independently of the first circuit.

10. In a device of the class described, the combination with a galvanometer, of a thermo-couple for actuating the galvanometer, an electric circuit which includes the galvanometer and the couple in parallel, a source of electrical energy in the circuit, electrical means for changing the polarity of the source, a relay in series with the source for actuating the electrical means, a switch actuated by the galvanometer for closing the circuit, and a resistance in series with the couple for changing the ratio of the electrical flow through the galvanometer from the source with respect to the flow through the couple from the source.

11. In a device of the class described, the combination with an electric circuit which includes a galvanometer and a thermo-couple, of a second circuit which includes the galvanometer, a relay and a source of electrical energy in the second circuit, an electrical means controlled by the relay for changing the polarity of the source, and a switch operated by the galvanometer for closing the second circuit.

12. In a device of the class described, the combination with an electric circuit which includes a galvanometer, a thermo-couple, a switch, and a potentiometer, of an indicating needle actuated by the galvanometer, a contact piece for intercepting the needle and making electrical contact therewith, electrical means for moving the contact piece out of the path of the needle, a source of electrical energy, a second circuit which includes the source, the galvanometer, the needle, the contact piece, and the electrical means, a second electrical means for actuating the switch and simultaneously changing the polarity of the source, and a second switch operated by the first electrical means for controlling the second electrical means substantially as described.

13. In a device of the class described, the combination with a galvanometer, of a thermo-couple, a potentiometer, a second potentiometer, a third potentiometer, a circuit which includes the galvanometer, the couple, the first potentiometer and the second potentiometer, a second circuit which includes the galvanometer, the couple, the first potentiometer and the third potentiometer, an indicating needle actuated by the galvanometer, a contact piece for intercepting the needle and for making electrical contact therewith, electrical means for moving the contact piece out of the path of the needle, a source of electrical energy for energizing the electrical means, a third circuit which includes the source, the galvanometer, the needle, the contact piece and the electrical means, a switch for opening and closing the first circuit, a second switch for opening and closing the second circuit, a switch mechanism for reversing the polarity of the source in one direction, a second switch mechanism for reversing the polarity of the source in the opposite direction, a second electrical means for opening the first switch and the first switch mechanism and simultaneously closing the second switch and the second switch mechanism, a third electrical means for closing the first switch and the first switch mechanism and simultaneously opening the second switch and the second switch mechanism, a third switch operated by the first electrical means for controlling the second and third electrical means substantially as described.

14. In a device of the class described, the combination with a galvanometer, of a thermo-couple, a potentiometer, a second potentiometer, a third potentiometer, a circuit which includes the galvanometer, the couple, the first potentiometer and the second potentiometer, a second circuit which includes the galvanometer, the couple, the first potentiometer and the third potentiometer, an indicating needle actuated by the galvanometer, a contact piece for intercepting the needle and for making electrical contact therewith, electrical means for moving the contact piece out of the path of the needle, a source of electrical energy for energizing the electrical means, a third circuit which includes the source, the galvanometer, the needle, the contact piece and the electrical means, a switch for opening and closing the first circuit, a second switch for opening and closing the second circuit, a switch mechanism for reversing the polarity of the source in one direction, a second switch mechanism for reversing the polarity of the source in the opposite direction, a second electrical means for opening the first switch and the first switch mechanism and simultaneously closing the second switch and the second switch mechanism, a third electrical means for closing the first switch and the first switch mechanism and simultaneously opening the second switch and the second switch mechanism, a third switch operated by the first electrical means for controlling the second and third electrical means substantially as described, means for heating the couple, and means actuated by the second and third electrical means for turning the heating means off and on.

15. In a device of the class described, the combination with an armature, of a mechanical means for forcing the armature to its normal position, electrical means for moving the armature away from its normal position against the action of the mechanical means to a second position, a latch consisting of a catch and a finger for preventing the return of the armature to its normal position, but permitting a slight motion toward normal to a third position when the electrical means is deenergized, a second electrical means for releasing the latch to permit the mechanical means to force the armature back to its normal position when the first electrical means is deenergized, a second mechanical means for forcing the latch to its normal position when the second electrical means is deenergized, a switch which is opened by the armature when forced into its second position by the first electrical means, and closed by the armature when forced to either its third or normal position by the first mechanical means, a second switch which is closed by the armature when in its second and third positions and opened by the armature when in its normal position, a third switch and a fourth switch which are opened and closed respectively by the second electrical means when energized, and closed and opened respectively by the second mechanical means when the second electrical means is deenergized, a fifth switch and a sixth switch which are closed by the first electrical means when energized and are opened by the first mechanical means when the first electrical means is deenergized, a seventh switch and an eighth switch which are opened by the first electrical means when energized and closed by the first mechanical means when the first electrical means is deenergized, a galvanometer with an indicating needle, a contact piece the normal position of which is in the path of the needle and with which the needle is capable of making electric contact, a ninth switch, a third electrical means for simultaneously opening the ninth switch and forcing the contact piece out of the path of the needle, a third mechanical means for simultaneously closing the ninth switch and returning the contact piece to its normal position when the third electrical means is deenergized, a source of electrical energy, an electric circuit which includes the galvanometer, the needle, the contact piece, the third electrical means, the sixth switch, the source of electrical energy, and the fifth switch, a second circuit which includes the galvanometer, the needle, the contact piece, the third electrical means, the seventh switch, the source of electrical energy, and the eighth switch, a third circuit which includes the ninth switch, the source of electrical energy, the third switch and the first electrical means, a fourth circuit which includes the ninth switch, the source of electrical energy, the third switch, the second switch, the first switch, and the second electrical means, a fifth circuit which includes the ninth switch, the source of electrical energy, the fourth switch and the second electrical means, a thermo-couple, and a sixth circuit which includes the galvanometer and the couple.

16. In a device of the class described, the combination with an armature, of a mechanical means for forcing the armature to its normal position, electrical means for moving the armature away from its normal position against the action of the mechanical means to a second position, a latch consisting of a catch and a finger for preventing the return of the armature to its normal position, but permitting a slight motion toward normal to a third position when the electrical means is deenergized, a second electrical means for releasing the latch to permit the mechanical means to force the armature back to its normal position when the first electrical means is deenergized, a second mechanical means for forcing the catch to its normal position when the second electrical means is deenergized, a switch which is opened by the armature when forced into its second position by the first electrical means, and closed by the armature when forced to either its third or normal position by the first mechanical means, a second switch which is closed by the armature when in its second and third positions and opened by the armature when in its normal position, a third switch and a fourth switch which are opened and closed respectively by the second electrical means when energized, and closed and opened respectively by the second mechanical means when the second electrical means is deenergized, a fifth switch and a sixth switch which are closed by the first electrical means when energized and are opened by the first mechanical means when the first electrical means is deenergized, a seventh switch and an eighth switch which are opened by the first electrical means when energized and closed by the first mechanical means when the first electrical means is deenergized, a galvanometer with an indicating needle, a contact piece the normal position of which is in the path of the needle and with which the needle is capable of making electric contact, a ninth switch, a third electrical means for simultaneously opening the ninth switch and forcing the contact piece out of the path of the needle, a third mechanical means for simultaneously closing the ninth switch and returning the contact piece to its normal position when the third electrical means is deenergized, a source of electrical energy, an electric circuit which includes the galvanometer, the needle, the contact piece, the third electrical means, the sixth switch, the source of electrical energy, and the fifth switch, a second circuit which includes the galvanometer, the needle, the contact piece, the third electrical means, the seventh switch, the source of electrical energy, and the eighth switch, a third circuit which includes the ninth switch, the source of electrical energy, the third switch and the first electrical means, a fourth circuit which includes the ninth switch, the source of electrical energy, the third switch, the second switch, the first switch, and the second electrical means, a fifth circuit which includes the ninth switch, the source of electrical energy, the fourth switch and the second electrical means, a thermo-couple, a sixth circuit which includes the galvanometer and the couple, a single pole double throw switch which is actuated in one direction by the first electrical means and in the opposite direction by the second electrical means, and two adjustable potentiometers, one or the other of which is cut into the thermo-couple circuit by means of the double throw switch, depending upon whether the first electrical means or the second electrical means is energized.

17. In a device of the class described, the combination with a galvanometer, of an indicating needle which is deflected by the galvanometer, a contact piece extending into the path of the needle to prevent its deflection, an electro-magnet for forcing the contact piece out of the path of the needle, an electric circuit which includes the galvanometer and the magnet, and which circuit is closed by contact between the needle and the contact piece, electrical means controlled by the electro-magnet for changing the polarity of the circuit, a thermo-couple, and a separate circuit which includes the galvanometer and the couple for deflecting the needle against the contact piece.

18. In a device of the class described, the combination with a galvanometer, of an indicating needle actuated by the galvanometer, a contact piece in the path of the needle for making electrical contact with the needle, electrical means for forcing the contact piece out of the path of the needle, a source of electrical energy, a circuit which includes the needle, the contact piece, the electrical means, the source and the galvanometer, a shunt across the galvanometer which shunt includes a second source of electrical energy, and a resistance in series with the second source for adjusting the amount of current which passes through the shunt from the first source.

19. In a device of the class described, the combination with a galvanometer, of an indicating needle actuated by the galvanometer, a contact piece in the path of the needle for making electrical contact with the needle, electrical means for forcing the contact piece out of the path of the needle, a source of electrical energy, a circuit which includes the needle, the contact piece, the electrical means, the source and the galvanometer, a shunt across the galvanometer which shunt includes a second source of electrical energy, a resistance in series with the second source for adjusting the amount of current which passes through the shunt from the first source, and a potentiometer in the shunt for balancing the electro-motive force of the second source.

20. In a device of the class described, the combination with a galvanometer, of an indicating needle actuated by the galvanometer, a contact piece in the path of the needle for making electrical contact with the needle, electrical means for forcing the contact piece out of the path of the needle, a source of electrical energy, a circuit which includes the needle, the contact piece, the electrical means, the source and the galvanometer, a relay for changing the polarity of the circuit said relay being controlled by the electrical means, a shunt across the galvanometer which shunt includes a second source of electrical energy, a resistance in series with the second source for adjusting the amount of current which passes through the shunt from the first source, a potentiometer in the shunt for balancing the electromotive force of the second source, two auxiliary potentiometers for adding to or taking from the electro-motive force of the second source, and a two-way switch, actuated by the relay, for throwing one or the other of said two potentiometers in series with the second source.

FRITZ FREDERICK UEHLING.